E. EBERHARD.
DEVICE FOR MANUFACTURING SCREEN PHOTOGRAPHS FOR THE HALF TONE ENGRAVING PROCESS.
APPLICATION FILED JAN. 6, 1915.

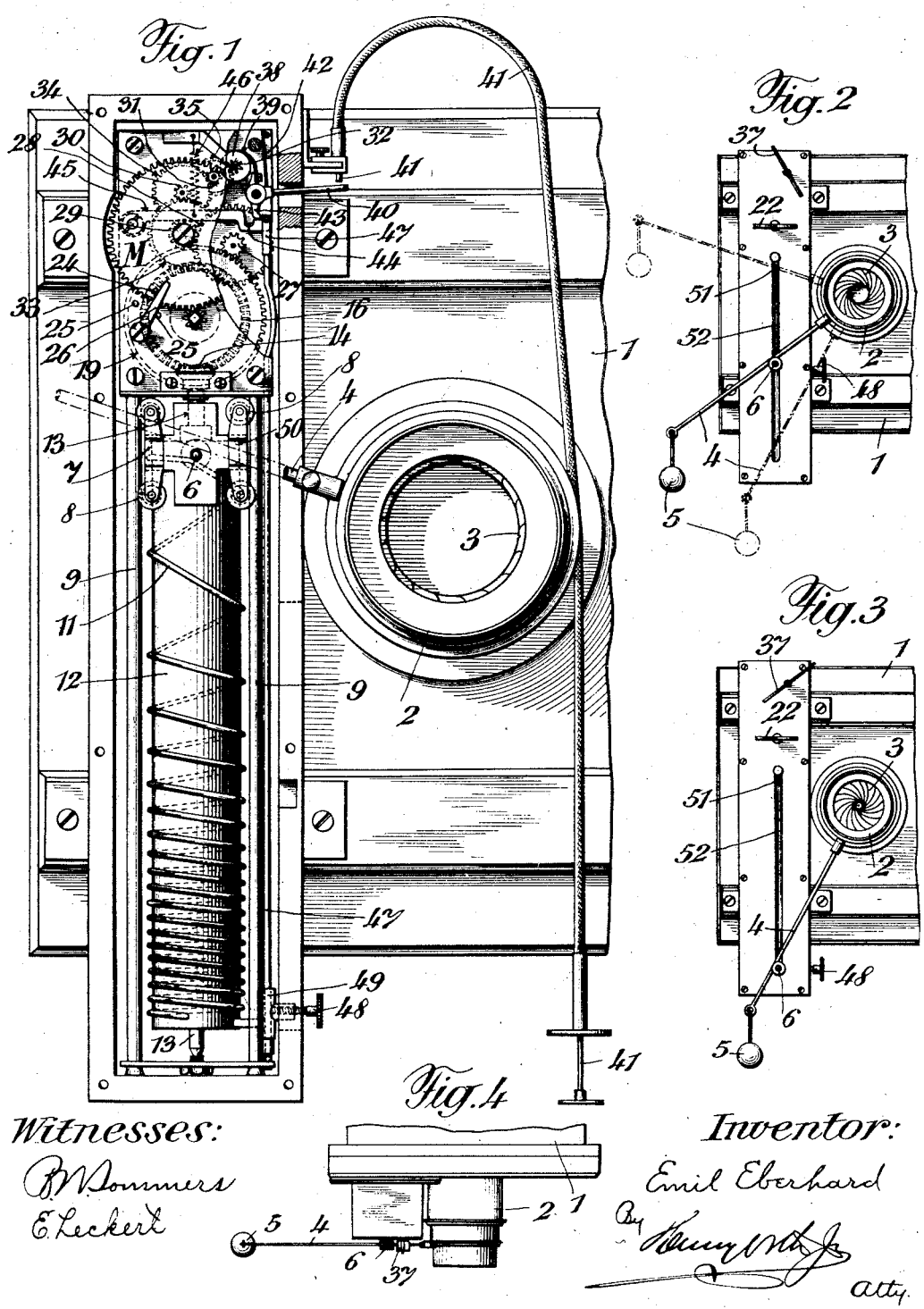

1,256,886.

Patented Feb. 19, 1918.
4 SHEETS—SHEET 2.

Witnesses:
B. W. Dommers
E. Leckert

Inventor:
Emil Eberhard
by Henry ...
atty.

E. EBERHARD.
DEVICE FOR MANUFACTURING SCREEN PHOTOGRAPHS FOR THE HALF TONE ENGRAVING PROCESS.
APPLICATION FILED JAN. 6, 1915.

1,256,886.

Patented Feb. 19, 1918.
4 SHEETS—SHEET 3.

Witnesses:

Inventor:
Emil Eberhard.

E. EBERHARD.
DEVICE FOR MANUFACTURING SCREEN PHOTOGRAPHS FOR THE HALF TONE ENGRAVING PROCESS.
APPLICATION FILED JAN. 6, 1915.
1,256,886.
Patented Feb. 19, 1918.
4 SHEETS—SHEET 4.
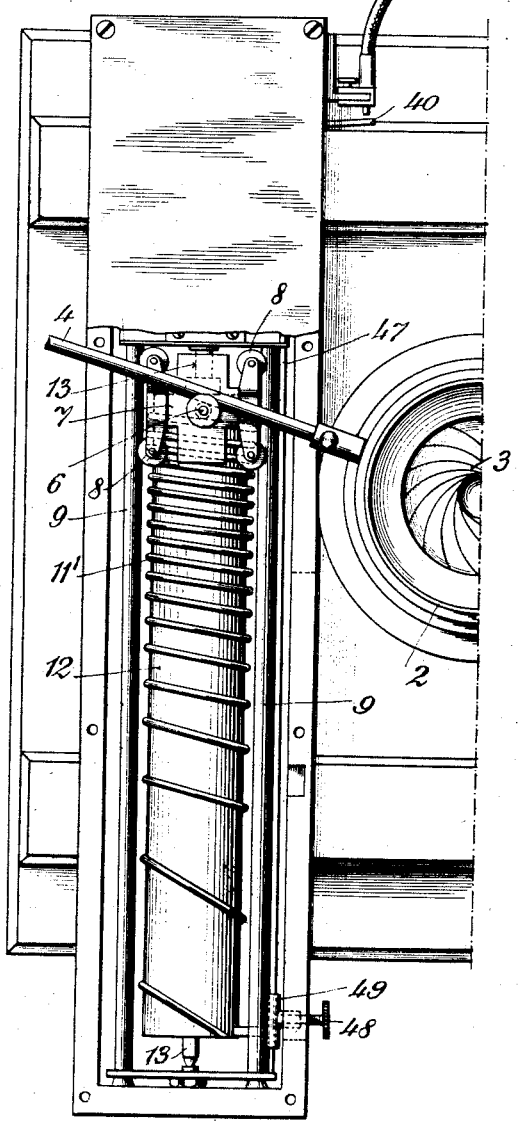
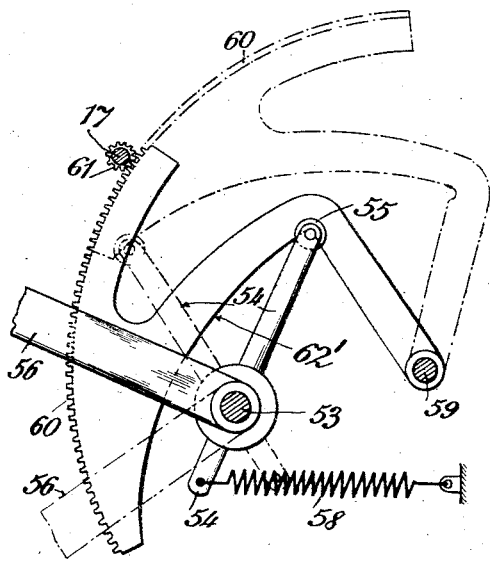
Inventor:
Emil Eberhard,
By Henry Orth Jr.
Atty.

UNITED STATES PATENT OFFICE.

EMIL EBERHARD, OF ZURICH, SWITZERLAND.

DEVICE FOR MANUFACTURING SCREEN-PHOTOGRAPHS FOR THE HALF-TONE-ENGRAVING PROCESS.

1,256,886. Specification of Letters Patent. Patented Feb. 19, 1918.

Application filed January 6, 1915. Serial No. 807.

*To all whom it may concern:*

Be it known that I, EMIL EBERHARD, a citizen of the Republic of Switzerland, residing at Zurich, Switzerland, have invented new and useful Improvements in Devices for Manufacturing Screen-Photographs for the Half-Tone-Engraving Process; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to a new and useful device for manufacturing screen - photographs used in the half-tone engraving process for reproducing photographs. It is well known that in order to maintain the gradations from the light to the shade in the manufacture of such screen - photographs there have to be used successively for one and the same object diaphragms provided with apertures of different size.

Now, according to my invention I use also an iris diaphragm and a mechanism for varying automatically the aperture of said diaphragm. The new feature and the improvement of my invention consist thereby in the fact that there are also provided means for varying progressively and automatically the motion-amplitude of said mechanism. In this connection I use the term "progressively" for expressing the fact, that, if the alteration in the motion-amplitude of the mechanism is an increasing one, said alteration remains permanently an increasing one, and that, if this alteration is a decreasing one, it will remain permanently a decreasing one. Thus the length of time during which the different apertures of varying size of the iris diaphragm are effective is varied automatically in such a manner that it corresponds to the diameter of the opening of the diaphragm just in use. Therefore the invention consists in the provision of means for changing the uniform motion of the mechanism into such a variable one, that the latter corresponds to the relation existing between the length of time during which the different apertures of varying size of the iris diaphragm are effective, and the diameter of the aperture just in use, and it further consists in the provision of means for transmitting this variable motion, which has been calculated in advance, on the iris diaphragm.

Two modes of carrying the invention into effect are shown by way of example on the accompanying drawings, in which:

Figure 1 is a front view of the first construction according to my invention, the cover being removed;

Figs. 2 and 3 show the same view on a smaller scale; the iris diaphragm being illustrated in different positions;

Fig. 4 is a plan view of Fig. 2;

Fig. 9 is a view similar to Fig. 1, showing the guide in a reverse position.

Fig. 10 is an enlarged detail view showing a modification of the parts shown in Fig. 8.

Figure 5:
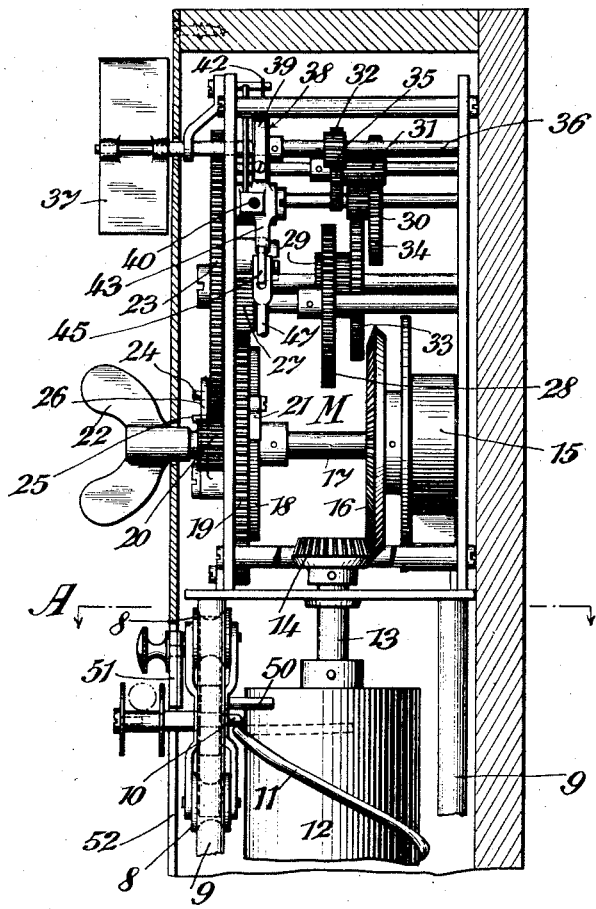
Fig. 5 shows on a larger scale a side view of the upper part of Fig. 1, some parts of the casing being omitted.
Figure 6:
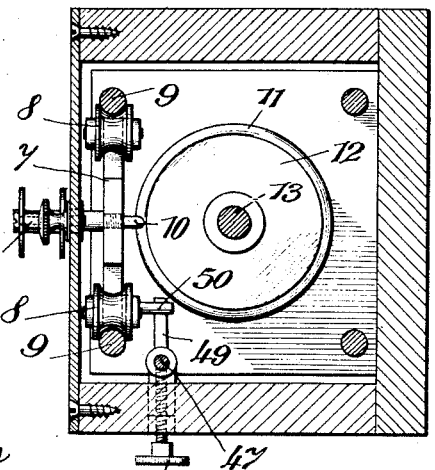
Fig. 6 is a section on the line A—B of Fig. 5.

In the first construction according to my invention shown in Figs. 1–6, 1 denotes the board for the objective of a photographic reproduction-camera; 2 is the objective and 3 the iris diaphragm of known construction provided on the apparatus. To the ring of the iris diaphragm is fixed the rod 4 provided on its free end with a weight 5. This rod 4 rests loosely on a pin 6 attached to a carriage 7, which is provided with four lateral wheels 8 coöperating with two vertical guide-rails 9. The weight 5 imparts to the carriage 7 and also to the rod 4 the tendency to move downward and to close the iris diaphragm. On the rear side of the carriage 7 there is provided a pin 10 (Fig. 5) resting on a spiral guide 11 of a vertical drum 12. The guide 11 is arranged in the form of an irregular helical line on the cylinder 12, the distance of the threads of this helical line being greater at the top than at the bottom, *i. e.*, the pitch is continually decreasing toward the bottom at a predeterminate rate. This curve 11 represents a means for varying the length of time, during which every single aperture of varying size of the iris diaphragms 3 is effective, in accordance with the diameter of the aperture of the diaphragm just in use. The lower end of the axle 13 is rotatably mounted in a bearing. To the upper end of this axle there is fixed a bevel-wheel 14 (Fig. 5) which forms a part of a mechanism M. This mechanism consists of a spring actuated driving gear. At 15 there is mounted a spring of known construction having the tendency to rotate the bevel-wheel 16 and, therefore, also the bevel-wheel 14. A ratchet-wheel 18 is fixed to the axle 17; on the latter is also loosely mounted the toothed wheel 19 connected to the pinion 20. The toothed wheel 19 carries a spring controlled pawl 21, which upon a counter-clockwise rotation of the ratchet wheel 18 drives the toothed wheel 19. To the front end of the axle 17 there is fixed the grip or key 22 serving for winding up the spring. The pinion 20 meshes with a toothed wheel 23 loosely mounted on its axle and having a projecting pin 24 (Fig. 1) which strikes against a stop piece swinging between two pins 26 as soon as the spring is wholly wound up or when it is run down. The toothed wheel 19 meshes with a pinion 27 rigidly connected to the toothed wheel 28. The pinions 29, 30, 31, 32 and the toothed wheels 33, 34, 35 transmit the motion to the shaft 36 carrying the exchangeable fan blade 37 regulating the speed of the mechanism M and also carrying the brake-disk 38. A spring controlled lever 39 is pressed against this disk 38. The lever 39 is rigidly connected to the releasing lever 40 which can be depressed downward by means of the wire releasing-device 41 of known construction. In this latter case a spring 42 will be tensioned and a nose 43 is brought to engage a recess 44 of a lever 45 subjected to the pull of a spring 46. The lever 45 is operatively connected to a rod 47. On the lower end of the rod 47 there is mounted a stop 49 capable of being adjusted vertically on said rod by means of the screw 48. The carriage 7 is provided with a pin 50 (Fig. 6) in the path of movement of which projects the stop 49. 51 denotes a pin limiting the upward movement of the pin 6 provided on the carriage 7 and projecting through the slot 52 beyond the casing, where the rod 4 rests on it.

Upon an actuation of the wire-releasing device 41 in the position of the apparatus shown in Fig. 1 and upon the winding up of the spring of the mechanism M, the lever 40 is depressed and the brake 38 will be released, so that the mechanism M can revolve at a uniform speed of rotation. Under these conditions the drum 12 will also be rotated at a uniform speed. Therefore, the carriage 7 and the rod 4 connected therewith and acted upon by the weight 5 are moved downward, thus partially closing the iris diaphragm. The helical guide 11 has, however, the effect to change the uniform motion of the mechanism M into a variable one. While the large apertures of the iridescent diaphragm become operative the carriage 7, owing to the provision of the guiding-surface 11, is moved at a greater speed than during the time, in which the smaller apertures are operative, the relation between the speed of these motions being exactly proportional to the apertures of the diaphragms of different size and this relation being brought about by said guiding-surface (see also Fig. 2). The motion-amplitude varies hereby permanently in a progressive manner, i. e., the closing motion of the iris diaphragms becomes progressively smaller. Should it become necessary to start the exposure with the smallest aperture of the iris diaphragm, the cylinder 12 would have to be arranged in an inverse manner, so that the distance between the threads of the helical line 11 would be greater at the bottom of the cylinder 12 than at its top. Upon the striking of the projecting pin 50 of the carriage 7 against the stop 49, the rod 47 is pulled downward, so that the resilient lever 39 acted upon by the spring 42 will again be pressed against the brake disk 38 to stop the driving gear of the mechanism M. This is possible owing to the fact, that the lever 45 has been pulled downward by the rod 47 causing thereby the projection 43 to be moved out of the recess 44.

Figure 7:
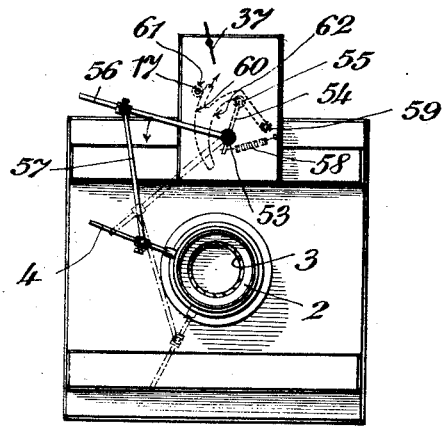
Fig. 7 is a front view of the second mode of carrying the invention into effect and Fig. 8 shows a part of this construction on a larger scale.
Figure 8:
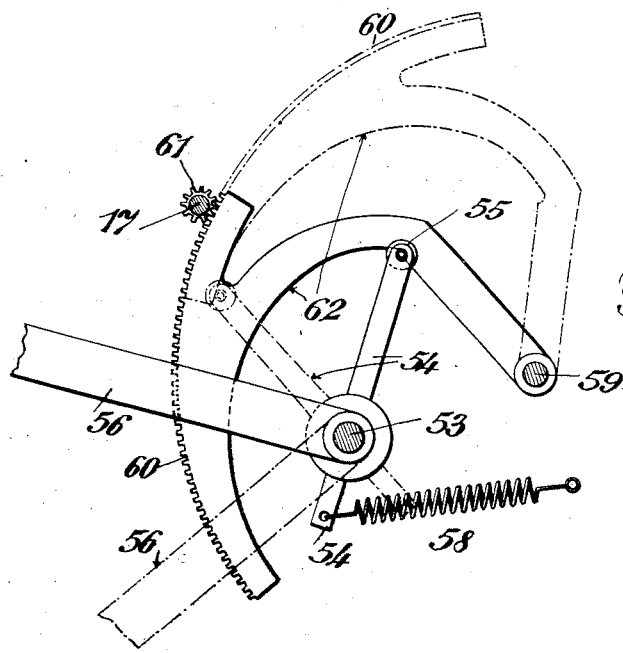

In the construction shown in Figs. 7 and 8, 17 denotes the axle receiving from the mechanism M a uniform rotatory motion. A lever 54 carrying a roller 55 and a lever 56 connected by means of a swingrod 57 to the lever 4 of the iris diaphragm 3 are rigidly connected to the shaft 53. The lever 54 is acted upon by a spring 58. A toothed wheel segment 60 is pivotally mounted on a pin 59. The segment meshes with a pinion 61 of the works of the mechanism and it has a curved guiding surface 62 against which is pressed said roller 55 acted upon by the spring 58. The shape of this curved guiding surface 62 is fixed in advance in such a manner that the uniform motion of the segment 60 transmitted on the levers 54, 56 the rod 4 and the iris diaphragm becomes a variable motion. This curved surface 62 shown in the second construction represents therefore the equivalent to the roll-shaped helical line 11 shown in the first construction. The manner of operation of this second construction corresponds to that of the first described arrangement.

In Fig. 9 the roller 12 is in the reverse position to that shown in Fig. 1 so that the pitch of the spiral guide 11' continually increases toward the bottom. In Fig. 10 the curve 62' is also the reverse of the curve 62 shown in Fig. 8.

I claim:

1. In a device for making screen negatives or positives for the half-tone engraving process, an iris diaphragm, mechanism for automatically varying the apertures of said diaphragm during an exposure between two definite openings of said diaphragm, an irregularly curved guide for an element of said mechanism for imparting movement to said diaphragm to automatically and continuousy alter the rate of movement of the diaphragm.

2. In a device for making screen negatives or positives for the half-tone engraving process, an iris diaphragm, mechanism for varying the aperture of said diaphragm during an exposure, and means comprising an irregularly curved guide for varying the length of infinitesimal time corresponding to each momentary size of the aperture in the course of changing its size.

3. In a device for making screen-negatives or positives for the half-tone engraving process, an iris diaphragm, mechanism having uniform motion, an irregularly curved guide actuated by said mechanism for changing said uniform motion into a variable motion, and means for transmitting said variable motion to the iris-diaphragm.

4. In a device for making screen-negatives or positives for the half-tone engraving process, an iris diaphragm, mechanism having uniform motion, and means for changing the uniform motion into such an irregular one that the duration of motion corresponds with the apertures of the diaphragm.

5. In a device for making screen negatives or positives for the half-tone engraving process, an iris diaphragm, mechanism for obtaining a uniform rotary motion, a drum uniformly rotated by said mechanism, an irregularly curved guide provided on the outer surface of the drum, a carriage guided by said guide, and means transmitting the motion of the carriage to the iris diaphragm.

6. In a device for manufacturing screen-photographs, an iris diaphragm mechanism for obtaining a uniform rotatory motion, a drum uniformly rotated by said mechanism, an irregularly curved guide provided on the outer surface of the drum, a carriage guided by said guide and means transmitting the motion of the carriage to a diaphragm.

7. In a device for making screen-photographs, an iris diaphragm, a driving mechanism, means to release said mechanism at will, mechanism connected to said diaphragm to actuate it during the taking of a photograph and controlled from said driving mechanism, and means actuated by said diaphragm connected mechanism at the end of its movement to stop said driving mechanism.

In testimony that I claim the foregoing as my invention, I have signed my name in presence of two subscribing witnesses.

EMIL EBERHARD.

Witnesses:
 ERNST FISCHER,
 CARL GUBLER.